May 3, 1938. J. Y. TAYLOR ET AL 2,116,164
EDUCATIONAL DEVICE
Filed Jan. 21, 1937 2 Sheets-Sheet 1
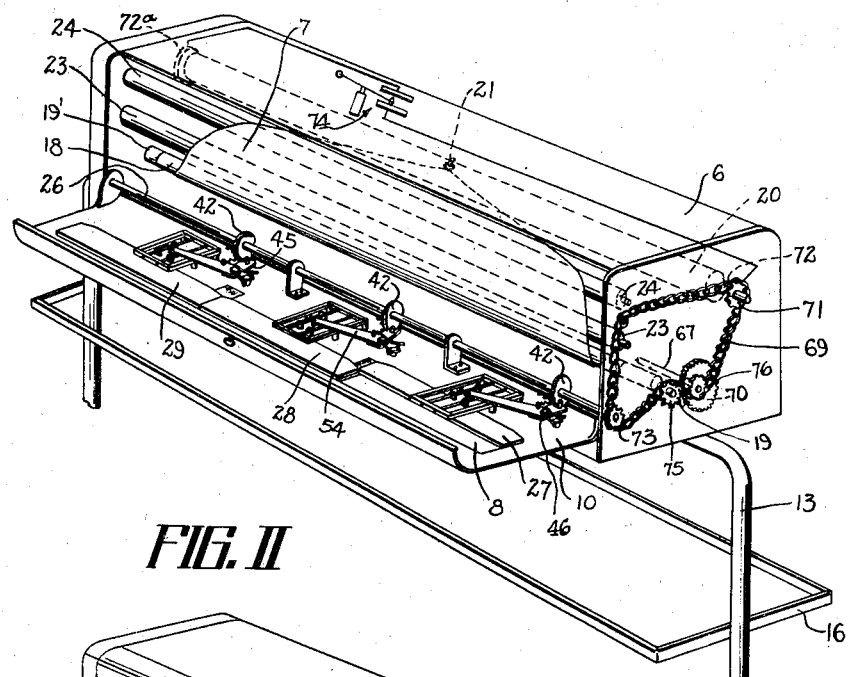
FIG. II
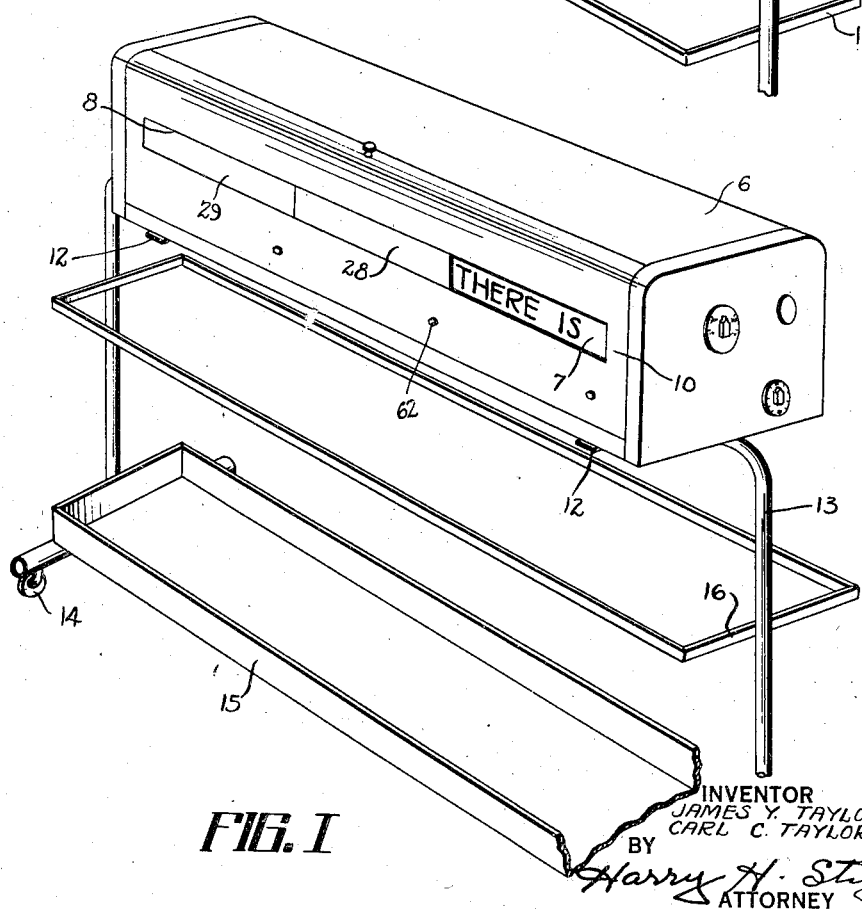
FIG. I
INVENTOR
JAMES Y. TAYLOR
CARL C. TAYLOR
BY
Harry H. Styll
ATTORNEY May 3, 1938.  J. Y. TAYLOR ET AL  2,116,164
EDUCATIONAL DEVICE
Filed Jan. 21, 1937   2 Sheets-Sheet 2
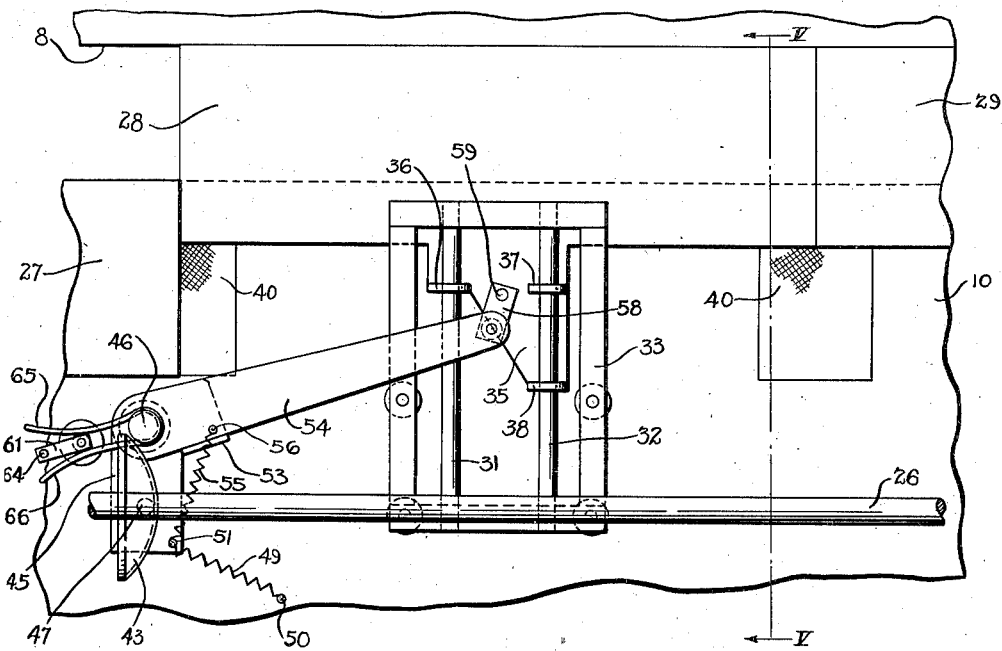
FIG. IV
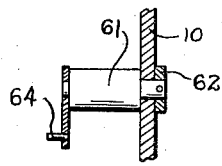
FIG. VI
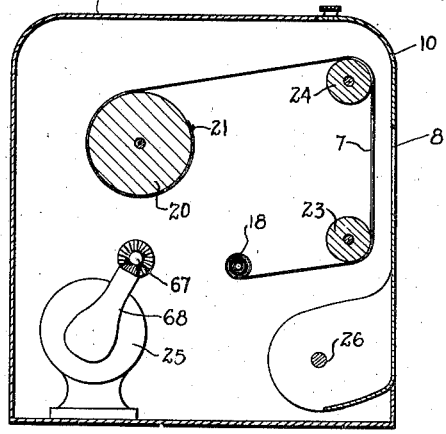
FIG. III
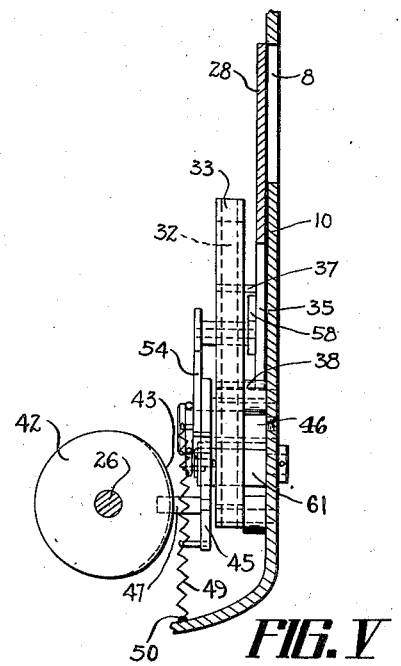
FIG. V
INVENTOR
JAMES Y. TAYLOR
CARL C. TAYLOR
BY
Harry H. Styll
ATTORNEY

Patented May 3, 1938

2,116,164

UNITED STATES PATENT OFFICE 2,116,164

EDUCATIONAL DEVICE

James Y. Taylor, Southbridge, Mass., and Carl C. Taylor, Brownwood, Tex., assignors to Educational Laboratories, Inc., Brownwood, Tex., a corporation of Texas Application January 21, 1937, Serial No. 121,612

21 Claims. (Cl. 35—35)

This invention relates to improvements in the type of apparatus disclosed in the patent to James Y. Taylor, 1,918,298 patented July 18, 1933; and more particularly to an improved construction which affords access to the interior by pivotally mounting the front wall of the casing.

The present application is a continuation in part of our co-pending application Serial No. 737,630, filed July 30, 1934, for Educational devices.

In the accompanying drawings which illustrate the invention:

Fig. I is a perspective view of the apparatus embodying the present invention;

Fig. II is a perspective view of the apparatus showing the front wall swung to open position;

Fig. III is a sectional view through the casing adjacent one end thereof;

Fig. IV is a detailed view looking at a portion of the front wall from the interior thereof;

Fig. V is a sectional view taken on line V—V of Fig. IV; and

Fig. VI is a sectional detail view showing the crank by which to throw the shutters manually.

In the illustrative embodiment shown, a casing 6 encloses an exhibitor 7 and the mechanism for causing this exhibitor to travel within the casing so as to be viewed through a window 8. This window is formed at or adjacent the upper edge of a wall 10 which is pivotally mounted so as to swing outwardly from the casing.

The casing rests upon pads or cross arms 12 provided at the top of a frame 13 mounted on wheels or casters 14. A tray 15 is carried by the frame 13 adjacent the floor level for supporting the stock of exhibitors for use in the apparatus. A rack 16 is carried by the frame above the tray to brace the exhibitors.

The exhibitor is of the roll type. Preferably the matter shown is carefully prepared so as to attract the interest of the observer. When the apparatus is to be used for training in rhythmic reading, the matter may take the form of a story. The device can also be used in teaching arithmetic. The indicia, such as printed matter or the like, are arranged line by line so that the successive lines may be exposed for view through the window 8, and are carried by a long strip or web of suitable material, such as cloth or paper. Such a strip or web wound up on a supply roller 18 may, in accordance with our invention, be inserted within the casing when the front wall 10 is swung outwardly, as will be later explained. One end of the roller 18 is engaged by the square end of a stub rewind shaft 19 while the other end is supported by a spring tension sliding stud 19'. The shaft 19 and stud 19' are journalled in opposite end walls within the casing 10, these walls affording a support for the actuating mechanism in the manner indicated in the above mentioned patent.

The mechanism for advancing the exhibitor 7 step by step past the window 8 includes a winding roller 20 which is intended to remain permanently within the casing, and is provided with a suitable hook 21 for engaging an eye at the leading end of the exhibitor. This hook is so positioned that when the roller 20 rotates in a counter-clockwise direction (as viewed in Fig. III) the exhibitor is wound on to the winding roller; whereas, when the exhibitor travels in the opposite direction so that the roller 20 turns in a clockwise direction, the hook 21 automatically disengages the eye of the exhibitor. In advancing from the supply roller 18 to the winding roller 20 the exhibitor passes over guide rollers 23 and 24 mounted behind the front wall 10 so that the successive portions of the exhibitor are positioned close behind the window 8.

The winding roller 20 is intermittently rotated through a sufficient angle to advance the exhibitor to expose the next line of symbols or other indicia; and although any suitable mechanism may be employed for thus actuating this winding roller, of which the star wheel and cam disc of the Taylor Patent No. 1,918,298 is an example, we prefer to actuate this winding roller 20 in the manner disclosed and claimed in the co-pending application Serial No. 123,641 filed Feb. 2, 1937. The same motor 25 which is connected through the intermittent drive to the winding roller 20 may be employed for continuously rotating the cam shaft 26. Shutters 27, 28 and 29 are arranged in cooperative relation to the window 8 for interrupting view of the exhibitor 7 through the window, for the purpose set forth in Taylor Patent No. 1,918,298.

In accordance with the disclosure of that patent, the supply roller carrying the exhibitor is introduced through the rear of the casing. It is less awkward to introduce the supply roller through the front of the casing, especially where the apparatus is kept against the wall of the school room or office. Such insertion of the roller 18 through the front of the casing would be a delicate operation if the shutters 27, 28 and 29 remained in vertical position when the front of the casing is swung outwardly. Instead, we cause these shutters to swing outwardly with the front wall 10 so that they do not block access to the interior of the casing when the front wall 10 is swung outwardly. In working out this improvement we have found it decidedly advantageous to provide actuating mechanism for the shutters whose operativeness continues during swinging of the wall 10. Instead of providing parts which get out of mesh or in other manner break the driving connection to the shutters when the latter swing outwardly, we so arrange the actuation of the shutters that the driving connections remain operative when the shutters swing outwardly with the wall 10.

As shown more particularly in Figs. IV and V of the drawings, a pair of slides, 31 and 32, are provided for each shutter, the pair of slides being mounted on a frame 33 secured to the rear face of the wall 10 below the window 8. Each shutter is preferably formed of sheet material and colored substantially the same color as the background of the exhibitor 7. An integral mounting portion 35 extends downwardly from the central portion of the bottom edge of each shutter; and three ears 36, 37 and 38 are struck up from the portion 35 to provide three bearings which cooperate with the slides 31 and 32. Strips of fabric 40, preferably a fabric with a nap, are applied to the back of the wall 10 in such position as to underlie the end edges of the shutters 27, 28 and 29. It will be noted from Figs. IV and V that the wall 10 carries the shutters 27, 28 and 29; and that the latter would be in sliding engagement with this wall were it not for the interposed strips 40 which have a function analogous to that of a lubricant. These strips of fabric slidably engage the shutters so as to avoid friction and noises in operation of the shutters. Preferably these strips of fabric have a nap, which improves the noise deadening effect on the shutters and helps to cut down friction.

The cam shaft 26 carries as many cams 42 as there are shutters. Each cam has a low portion 43 on its side, which portion is for permitting the respective shutter to move upwardly to blank out a portion of the line exposed in the window 8. A rocker 45 is pivoted on the rear face of the wall 10 by a stud 46. This rocker carries a cam follower in the form of a roller 47 which is arranged to travel on the side of the cam adjacent its periphery and so as to move to the right (as seen in Fig. IV) when riding on the low portion 43 of the cam. A tension spring 49 is secured to the swinging wall 10 at 50 and is connected to a pin 51 on the lower end of the rocker 45 so as to pull the follower against the cam and bias the rocker towards the position in which the shutter is elevated.

The other arm of the rocker 45 has a rest 53 which underlies the actuating lever 54 for the shutter. This lever is likewise pivotally mounted on the stud 46 and is biased in a clockwise direction toward the rest 53 by a spring 55 connected to the pin 51 and to a second pin 56 on the arm 54. The outer end of the arm 54 is pivotally connected to a link 58 pivoted at 59 to the portion 35 of the shutter.

It will be noted that a plurality of bearings (37 and 38, as shown in Fig. IV) cooperate with the slide 32. This insures proper alignment of the shutter due to these bearings being spaced along the slide 32. It will be noted, moreover, that the plurality of bearings cooperating with the slide 32 are on the remote side from the lever or arm 54. We have found this to be an advantageous arrangement for preventing skewing of the shutters.

A crank 61 is journalled in the front wall 10 adjacent each stud 46, as is clear from Figs. IV and V. The latter figure indicates the smaller diameter of the portion of the crank which passes through and is journalled in the wall 10. Each crank 61 is provided with a knob 62 on the outside of the wall 10 for operating the crank from the outside of the casing. Each crank 61, as is illustrated in Fig. IV, includes a portion turned at right angles for carrying a crank pin 64 which is interposed between a pair of lugs or abutments 65 and 66 which extend from the lever arm 54. These lugs 65 and 66 of course oscillate with the arm 54, and there is sufficient space between them so that the pin 64 may rest in central position. The fit of the crank 61 in the wall 10 is loose enough so that the pin 64 is moved to inoperative position if it happens to be left slightly off center.

When the knob 62 is turned so as to throw the pin 64 against one or the other of the lugs or abutments 65 or 66, the lever or arm 54 is positively rocked. Throwing the pin 64 substantially at right angles to central position locks the arm 54 in either raised or lowered position depending upon which is the direction of rotation of the crank 61.

The exhibitor advances past the window 8 step by step as the winding roller 20 is intermittently rotated. According to the disclosure of said copending application the motor 25 drives the shaft 67 (see Fig. III) through reduction gearing 68; and the chain 69 driven from the sprocket 70 on the shaft 67 drives the sprocket 71 on the magnetic clutch 72, and the sprocket 73 on the cam shaft 26. Electrical timing means including a relay controlled double-throw switch 74 are provided for alternatively actuating the magnetic clutch 72 and a magnetic brake 72a for alternatively rotating and holding stationary the roller 20. It will be appreciated that for the sake of simplicity, the mechanism for advancing the exhibitor 7 step by step past the window 8 is illustrated diagrammatically in Figs. II and III.

The rewind shaft 19 is connected by a friction clutch with a gear 75 meshing with a gear 76 fixed on the shaft 67. So long as the clutch and brake associated with the roller 20 act upon that roller, the gear 75 rotates relative to the rewind shaft 19 due to the friction clutch. When the clutch and brake are both released, the exhibitor, instead of advancing, is rewound on the roller 18 due to the drive from the gears 75 and 76 through the friction clutch to the rewind shaft 19.

As above mentioned, either this particular actuating mechanism or other suitable actuating mechanism may be used for rotating the cam shaft 26 and for bringing about intermittent travel of the exhibitor 7 past the window 8 in timed relation thereto.

During normal operation of the mechanism actuating the shutter, the pin 64 is in central position and the springs 49 and 55 respectively maintain the cam follower 47 against the cam 42 and the arm 54 against the rest 53. This means that the arm 54 swings as though an integral part of the rocker 45, and the cam follower 47 causes the arm 54 to intermittently raise and lower the shutter. If the crank 61 be turned in a clockwise direction (as viewed in Fig. IV) the lug 65 is forced upwardly (or is forced to remain in raised position) so that as the cam 42 rotates, the cam follower 47 is prevented from dropping down into the low portion 43 of the cam. In other words, the spring 49 is not permitted to draw the cam follower 47 into this low portion of the cam. If on the other hand, the crank 61 be rotated in a counter-clockwise direction, the abutment 66 is forced downwardly (or is locked in lowered position) so as to raise or hold the arm 54 in raised position. The cam follower now continues to follow the periphery of the cam 42, but the lever 54 does not follow the rest 53 downwardly when the rocker turns about the stud 46 so that the follower 47 may ride on the flat portion of the cam 43.

It will be apparent, therefore, that we have provided mechanism for yieldably actuating the shutter since this mechanism includes a driving member such as 42 and a yieldable connection including the springs 49 and 55 between this driving member and the shutter. It is thereby arranged that the shutter may be positively moved by the crank 61 either to raised or lowered position. Moreover, the shutter may be locked in either position and the crank is operable from outside the casing.

Such an arrangement which gives the operator control of the position of each individual shutter without opening the casing is clearly advantageous, since any portion of a line of the exhibitor can be blanked out at any time. For instance, if the roll is to be used in teaching arithmetic, the shutter 27 may be locked in closed position (or in open position) so as to hide the answers (or so as to keep the answers always in view).

The arrangement of the shutters and actuating mechanism therefor so as to swing outwardly when the front wall is swung outwardly is of advantage in permitting the exhibitor to be installed without these shutters being in the way. It is particularly advantageous to have the drive from the cam shaft 26 to the shutters continually operative even though the wall 10 be swung outwardly, since the apparatus is intended for use by persons who may not have mechanical skill. If the driving connections were so arranged that it would be dangerous to these driving connections to open the front wall 10, there would be more chance for injury to the apparatus. In other words, this arrangement renders the apparatus more nearly fool-proof.

This same advantage is brought to the user of the apparatus by the arrangement for selectively locking the shutters either in closed or open position without regard to the normal driving connections therefor, ample safe-guard being given furthermore against accident in case any obstruction should be put negligently in the way of normal shutter action.

While we have illustrated and described an embodiment of our invention which we at present prefer it will be understood that the invention may be otherwise embodied and practiced within the scope of the following claims.

We claim:

1. In an educational device, the combination of a casing having a window, an exhibitor mounted within the casing and bearing indicia or symbols in a plurality of horizontal lines for display through the window, shutters for closing separate portions of the window, means for operating said shutters in sequence whereby portions of each line of indicia are displayed in sequence, means for actuating the exhibitor whereby the next line of indicia becomes visible through the window after the preceding line is displayed and means for holding any of the shutters in either an open or closed position while the remaining shutters are operating.

2. In a displaying apparatus the combination of a casing having a window, means for displaying indicia before said window, a plurality of shutters for closing separate portions of said window, operating means comprising a connection having a positive drive in one direction for moving said shutters to closed position and a resilient drive in the opposite direction and resilient means adapted to move said connection in the direction of positive drive to normally urge said shutters to closed position, and means for moving said connection in the direction of said resilient drive against the action of said resilient means to move said shutters to uncover said window.

3. In a displaying apparatus the combination of a casing having a window, means for displaying indicia before said window, a plurality of shutters for closing separate portions of said window, operating means comprising a connection having a positive drive in one direction for moving said shutters to closed position and a resilient drive in the opposite directon and resilient means adapted to move said connection in the direction of positive drive to normally urge said shutters to closed position, and means for moving said connection in the direction of said resilient drive against the action of said resilient means to move said shutters to uncover said window, and means for selectively locking any of said shutters against operation while others are operated.

4. In an educational device, a casing having a front wall adapted to swing outwardly from said casing, a window in said casing, a roll type exhibitor removably mounted in said casing and insertable through the front of the casing when said front wall is swung outwardly, means for moving said exhibitor intermittently past said window, and means swingable with said front wall and actuated in timed relation to the movements of said exhibitor for interrupting view of said exhibitor through said window.

5. In an educational device, a casing having a front wall adapted to swing outwardly from said casing, said casing having a window, an exhibitor disposed within said casing so as to be viewed through said window, and means on said swinging wall and movable relative thereto into and out of position for interrupting view of said exhibitor through said window.

6. In an educational device, a casing including a front wall hung to swing outwardly, said casing having a window, an exhibitor so mounted to travel within said casing as to be viewed through said window, a shutter movably carried by said swinging wall, and means for operating said shutter to intermittently interrupt view of said exhibitor through said window.

7. In an educational device, the combination as claimed in claim 6, in which the shutter moves on a slide carried by the swinging front wall.

8. In an educational device, a casing including a front wall pivotally mounted to swing outwardly and providing in said casing a window, an exhibitor disposed within said casing so as to be viewed through said window, a shutter slidably carried by said swinging wall so as to move to and from position for interrupting view of said exhibitor through said window, and mechanism for sliding said shutter including a lever pivotally mounted on said swinging wall.

9. In an educational device, a casing provided with a window, an exhibitor disposed within said casing so as to be viewed through said window, a shutter for interrupting view of said exhibitor, and means for movably mounting the shutter on said casing in cooperative relation to said window including a pair of parallel slides and at least three bearings on the shutter engaging said slides, two of said bearings being spaced along one of said slides for maintaining the shutter in predetermined alignment.

10. In an educational device, a casing having a front wall adapted to swing outwardly from said casing and providing a window in said casing, an exhibitor disposed within said casing so as to be viewed through said window, a shutter movably carried by said swinging wall so as to interrupt view of said exhibitor through said window, and mechanism whose operativeness continues during swinging of said wall for actuating said shutter, said mechanism including a shaft rotatable on the axis of swinging of said front wall.

11. In an educational device, a casing having a front wall pivotally mounted to swing outwardly from said casing and providing a window in said casing, an exhibitor mounted to travel within said casing so as to be viewed through said window, a shutter movably carried by said swinging wall so as to interrupt view of said exhibitor through said window, and means for actuating said shutter including a cam rotatable on the axis of swinging of said front wall and a cam follower swingable with said front wall.

12. In an educational device, a casing having a front wall pivotally mounted to swing outwardly from said casing and providing a window in said casing, an exhibitor mounted to travel within said casing so as to be viewed through said window, a shutter slidably carried by said swinging wall so as to move to and from position for interrupting view of said exhibitor through said window, a cam rotatable on the axis of swinging of said front wall and mechanism actuated from said cam and carried by said front wall for sliding said shutter, said mechanism including a cam follower adapted to cooperate with said cam in all positions of said front wall.

13. In an educational device, a casing provided with a window, an exhibitor mounted to travel within said casing so as to be viewed through said window, a shutter for intermittently interrupting view of said exhibitor through said window, mechanism for yieldably actuating said shutter, and means for locking said shutter against movement whereby said mechanism is required to yield.

14. In an educational device, a casing provided with a window, an exhibitor mounted to travel within said casing so as to be viewed through said window, a shutter for intermittently interrupting view of said exhibitor through said window, mechanism for actuating said shutter including a driving member and a yieldable connection between said driving member and said shutter, and means operable from the outside of said casing for positively locking said shutter against movement.

15. In an educational device, the combination as claimed in claim 14 in which the shutter may be locked in either open or closed position selectively.

16. In an educational device, a casing provided with a window, an exhibitor disposed within said casing so as to be viewed through said window, shutters for closing adjacent portions of said window, means for moving said shutters relative to said casing in sequence and fabric carried by said casing for slidably engaging said shutters.

17. In an educational device, a casing provided with a window, an exhibitor mounted to travel within said casing so as to be viewed through said window, a shutter for intermittently interrupting view of said exhibitor through said window, mechanism for actuating said shutter, and means operable from the outside of said casing for positively moving said shutter, the actuation of the shutter by said mechanism being yieldable for permitting movement of the shutter by said positive moving means.

18. In an educational device, a casing provided with a window, an exhibitor mounted to travel within said casing so as to be viewed through said window, a shutter for intermittently interrupting view of said exhibitor through said window, mechanism for normally actuating said shutter including a driving member and a yieldable connection between said driving member and said shutter, and means controlled from the outside of said casing for altering the normal operation of said shutter whereby said connection is required to yield.

19. In an educational device, a casing having a front wall adapted to swing outwardly and providing a window in said casing, an exhibitor so mounted to travel within said casing as to be viewed through said window, a shutter movably carried by said swinging wall, and actuating means for moving said shutter to and from position for interrupting view of said exhibitor through said window, the operativeness of said actuating means continuing during swinging of said wall.

20. In an educational device, a casing provided with a window, an exhibitor so mounted to travel within said casing as to be viewed through said window, a shutter movable into and out of position for interrupting view of said exhibitor through said window and mechanism for actuating said shutter including a positive driving member, a connection between said positive driving member and said shutter and resilient means biasing said connection in a direction to move said shutter out of said position.

21. In an educational device, a casing provided with a window, an exhibitor mounted to travel within said casing so as to be viewed through said window, a shutter for interrupting view of said exhibitor, means for movably mounting the shutter in cooperative relation to said window including a pair of parallel slides and bearings on the shutter engaging said slides, and mechanism including a rock arm operatively connected to said shutter for operating the shutter to intermittently interrupt view of said exhibitor through said window, there being at least two of said bearings on the slide remote from said arm spaced along said slide for preventing deflecting of the shutter from predetermined alignment.

JAMES Y. TAYLOR.
CARL C. TAYLOR.